(12) United States Patent
Huempel et al.

(10) Patent No.: US 9,208,591 B2
(45) Date of Patent: Dec. 8, 2015

(54) PROVIDING USER CONTROLLED ABILITY TO DETERMINE DATA LEVEL OF DETAIL IN A GRAPH

(71) Applicant: International Business Machines Corporation, Armonk, NY (US)

(72) Inventors: Claus Huempel, Tuebingen (DE); Pamela A. Nesbitt, Ridgefield, CT (US); Jake Palmer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/865,342

(22) Filed: Apr. 18, 2013

(65) Prior Publication Data

US 2014/0313205 A1    Oct. 23, 2014

(51) Int. Cl.
*G06T 11/20*    (2006.01)
*G06F 17/40*    (2006.01)

(52) U.S. Cl.
CPC .................................. *G06T 11/206* (2013.01)

(58) Field of Classification Search
None
See application file for complete search history.

(56) References Cited

U.S. PATENT DOCUMENTS

| | | | |
|---|---|---|---|
| 4,183,087 A * | 1/1980 | Huelsman | ........................ 327/91 |
| 5,581,678 A | 12/1996 | Kahn | |
| 5,606,695 A | 2/1997 | Dworzecki | |
| 6,317,774 B1 | 11/2001 | Jones et al. | |
| 7,574,652 B2 | 8/2009 | Lennon et al. | |
| 2009/0109056 A1* | 4/2009 | Tamarkin et al. | ........ 340/870.02 |
| 2010/0235144 A1* | 9/2010 | Mosberger-Tang | ........... 702/188 |
| 2012/0173456 A1* | 7/2012 | Hirl | .............................. 705/36 R |
| 2012/0321157 A1 | 12/2012 | Yang et al. | |
| 2013/0006748 A1* | 1/2013 | Horvitz et al. | ............. 705/14.39 |

FOREIGN PATENT DOCUMENTS

JP        2005258548 A    9/2005

OTHER PUBLICATIONS

Weiss et al. "Leveraging smart meter data to recognize home appliances" 2012 IEEE International Conference on Pervasive Computing and Communications, Lugano Mar. 19-23, 2012.*
Itron White Paper, "Key Features of Meter Data Management Systems" by Sharelynn Moore, Itron Inc. published in 2008.*
Lu et al. "Smart Meter Data Analysis" Transmission and Distribution Conference and Exposition (T&D) 2012 IEEE PES, May 7-10, 2012.*

(Continued)

*Primary Examiner* — Yingchun He
(74) *Attorney, Agent, or Firm* — Yee & Associates, P.C.; Parashos Kalaitzis

(57) ABSTRACT

One embodiment of the invention comprises a method for constructing a graph pertaining to a specified metric. Measured values of the specified metric are selectively stored, wherein each stored value comprises a data point. The method further includes routing successive data points to a location associated with the graph, wherein a first number of data points are included in a specified graph time period. The method further includes using a value that represents a particular data level of detail to divide the specified graph time period into multiple time intervals, wherein each time interval includes a second number of data points. The method further includes selectively processing the second number of data points of a time interval, in accordance with prespecified criteria, to determine a most representative value for that time interval. The most representative values of respective time intervals are then used to construct the graph.

19 Claims, 7 Drawing Sheets

(56) References Cited

OTHER PUBLICATIONS

Accenture "Achieving high performance with smart meter data management systems", by Accenture published in 2011.*
SAP, "SAP Smart Meter Analytics Powered by SAP HANA Solution Overview", by SAP AG 2011.*
Cisco "Utility Data Management & Intelligence", Cisco Systems, Inc. May 2013.*
OSIsoft, "PI Statistical Quality Control" downloaded @ http://web.archive.org/web/20110305154337/http://www.osisoft.com/software-support/products/PI_Statistical_Quality_Control$_{13}$ (SQC).aspx, available online since Mar. 2011.*
Liu et al., "An LOD Model for Graph Visualization and its Application in Web Navigation," Proceedings of the 7th Asia-Pacific Web Conference on Web Technologies Research and Development (APWeb'05), Mar.-Apr. 2005, pp. 441-452.
Luebke et al., "GLOD: A Minimal Interface for Geometric Level of Detail," University of Virginia Department of Computer Science Technical Report, undated, 10 pages. Retrieved Mar. 28, 2013 from http://www.cs.virginia.edu/~luebke/publications/pdf/GLOD.submitted.pdf.
Balzer, et al., "Level-of-Detail Visualization of Clustered Graph Layouts", Proceedings of the 2007 6th International Asia-Pacific Symposium on Visualization (APVIS '07), Feb. 2007, pp. 133-140.
"UbiGraph XML-RPC Manual," UbiGraph, Jun. 2008, 9 pages. Retrieved Mar. 28, 2013 from http://ubietylab.net/ubigraph/content/Docs/index.html.

* cited by examiner

PROVIDING USER CONTROLLED ABILITY TO DETERMINE DATA LEVEL OF DETAIL IN A GRAPH

BACKGROUND

1. Field

The invention disclosed and claimed herein generally pertains to constructing or furnishing a graph of data produced over time, such as a graph of successive measured values of a specified metric. More particularly, the invention pertains to a graph of the above type, wherein a user determines the data level of detail for the graph.

2. Description of the Related Art

There are currently graphing and reporting technologies available that can present a range of graphs to an end user. These are particularly important to utilities for example, such as private energy companies or government water agencies, when tracking sensor measurements of certain types of metrics over time. It can be very useful or necessary for these entities to have the ability to present a view of these sensor measurements, such as to provide a historical perspective.

When a measurement graph of the above type is presented to an end-user, several important trade-offs can impact the data level of detail which is shown by the graph. These trade-offs include data level of detail versus data storage capacity; data level of detail versus data transfer and display performance; and data level of detail versus graph visual complexity. However, with currently used arrangements, a user is typically not made aware of these trade-offs. This results in a graph which can show either too much data or too little data, or may perform poorly for reasons that are not clear. For example, the system may perform poorly when requesting a high data level of detail, when only a low data level of detail is needed or desired for the user to perform a visual study of the data. In current arrangements, the user generally does not have an opportunity to select a particular desired level of detail, of the data to be used to generate or construct a data graph.

SUMMARY

Embodiments of the invention provide a user with the ability to control or determine each of the trade-offs described above, in regard to data level of detail. When a user provides the desired level of detail, this dictates how many data points are transferred. Embodiments may also divide the time period of a graph of data values into multiple intervals. The user then provides or chooses an algorithm for determining how an associated system selects a most representative value for each interval. By way of example and not limitation, the algorithm could process multiple data point values of an interval, to select the maximum, minimum, mean, median, earliest or latest value thereof. As a further option, a user could provide a customized algorithm to select the most representative value.

One embodiment of the invention comprises a computer implemented method for constructing a graph which pertains to measured values of a specified metric. The method includes the step of selectively storing measured values of the specified metric, wherein each stored value comprises a data point. The method further includes routing successive data points to a location associated with the graph, wherein a first number of data points are included in a specified graph time period. The method further includes using a value that represents a particular data level of detail to divide the specified graph time period into multiple time intervals, wherein each time interval includes a second number of data points. The method further includes selectively processing the second number of data points of a time interval, in accordance with prespecified criteria, to compute or determine a most representative value for that time interval. The most representative values of respective time intervals are then used to construct the graph.

DETAILED DESCRIPTION

Figure 1:
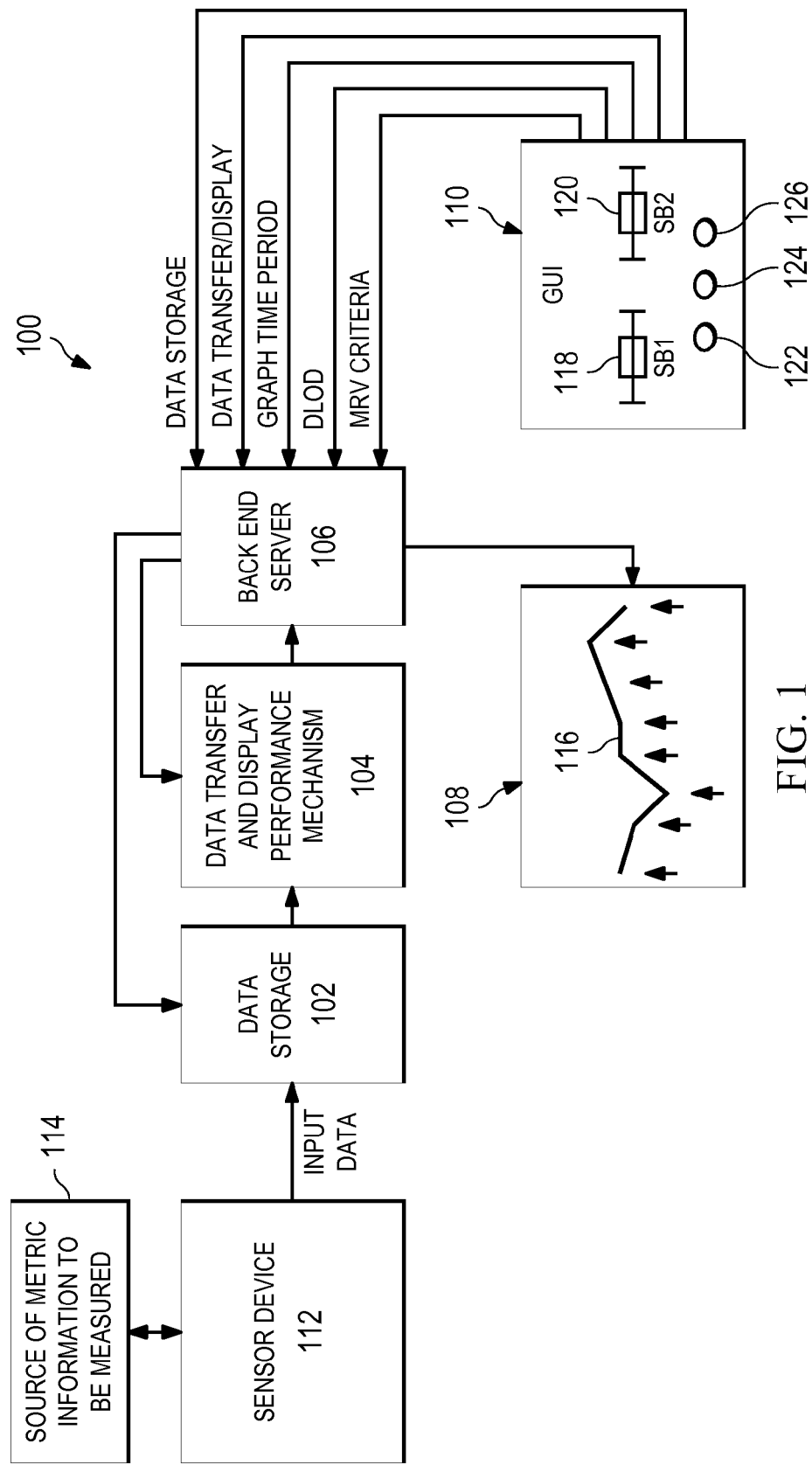
FIG. 1 is a block diagram showing respective components of a system for implementing an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, certain types of data are measured at specified or periodic time intervals, and then retained in a data storage or the like for later or historic reference. These data types include utility data, such as the amount of electric power used by a particular entity at successive time intervals, or the amount of water flow through a pipe or conduit at successive times. However, the invention also applies to many other types of data measured at specified intervals.

Referring to FIG. 1, there is shown a block diagram depicting a system 100, which may be used to implement embodiments of the invention. More particularly, system 100 comprises components 102-110, which receive input data from a measurement sensor device 112. Device 112 is provided to measure the value of a specified metric or the like at periodic intervals, wherein successive metric values are furnished to device 112 from a source of metric information 114.

By way of example, the metric to be measured could be the total amount of electric power that was collectively delivered to all power users in a particular geographically defined area. The sensor device would measure the value of this power, such as in kilowatts. Successive measured values would then be provided to data storage 102 as input data, such as at one minute intervals. However, it is to be emphasized that this example is provided solely for purposes of illustration, and the invention is by no means limited thereto.

Component 110 of system 100 comprises a workstation such as a graphic user interface (GUI). In accordance with embodiments of the invention, a user can operate GUI 110 to use input data from device 112 to construct a data graph 116, for display and viewing, by means of display device 108. However, as described above, the data level of detail of graph 116 is related to both the data storage capacity and the data transfer and display performance of system 100. Moreover, data level of detail is related to the visual complexity of a constructed graph. Accordingly, GUI 110, together with other components of system 100, are configured to enable a user to selectively vary the storage and retrieval of input data for a given graph 116. The user can thereby achieve a most useful trade-off between data level of detail, and one or more of the above aspects of system 100 that affect data level of detail.

Referring further to FIG. 1, there is shown a server 106, which usefully comprises a backend server. Backend server 106 is connected to receive instructions from GUI 110, and is further connected to control operation of both data storage 102 and data transfer and display mechanism 104. As described hereinafter in further detail, backend server 106 can also be used to determine and provide data values that comprise most representative values (MRV), for use in constructing respective graphs 116. FIG. 1 further shows GUI 110 providing backend server 106 with instructions or other inputs that specifically pertain to data storage 102, to data transfer and display mechanism 104, the time period for a given graph 116, the data level of detail (DLOD) for the given graph, and information for generating most representative data values for the given graph.

In a very useful embodiment of the invention, display 108 is a component or part of GUI 110, and is thus available for viewing by a user who is operating GUI 110. FIG. 1 further shows GUI 110 provided with slider bars 118 and 120, As described hereinafter in further detail, a user of GUI 110 can use the slider bars to readily vary both the data level of detail, and the amount of data that is made available to construct a graph 116. As an important feature of this embodiment, a user of GUI 110 can explore the data by simply adjusting the sliders to different combinations of slider values, and observing the results for different adjustments.

In other embodiments of the invention, display 108 could be included in a GUI that was separate from operators of GUI 110, such as an administrative GUI of some type. As a further embodiment, display 108 could comprise a printed graph 116 on a utility subscriber's bill.

In an embodiment in which display 108 is separate from GUI 110, it would be beneficial to place respective slider values in a configuration capability. That is, a given set of slider bar values would be stored or otherwise connected to the graph or view, which is provided by display 108 for the given set of slider bar values. GUI 110 is usefully provided with a button 126, for storing each set of slider bar values with its corresponding graph or view.

By providing the configuration of system 100 as shown, a user can operate GUI 110 and backend server 106 to readily control the storage or persistence of input sensor measurement data, and can also select a particular data level of detail for a graph 116. This capability is described hereinafter in further detail. In one embodiment of the invention, GUI 110 could be an application running on a client that communicates with backend server 106, in order to customize options and displayed graphs which are provided by the client. In another embodiment, GUI 110 could be a web client such as a web browser that is communicating with backend server 106, wherein the backend server is a Web server such as a website.

As an initial step in the operation of system 100, the user employs GUI 110 to send a data storage instruction to backend server 106. This instruction directs backend server 106 to operate the data storage 102 to commence storing or persisting data at a specified rate. As used herein, the term "persist" means to store data in non-volatile storage for later retrieval.

For the above example, wherein the input data to storage 102 comprises measured values of power use of a defined geographical area at one minute intervals, the user of GUI 110 could decide that an intended graph of such data, having a given predetermined data level of detail, would not require data at intervals of more than five minutes. Accordingly, backend server 106 would operate data storage 102 to start collecting input data values at five minute intervals, for later use in generating or constructing graphs 116. It will be seen that this capability eliminates any need to store more data than will be needed for an anticipated graph, and thus reduces storage capacity requirements for data storage 102. Also, the rate or frequency of data collection determines the maximum data level of detail that can be shown by a graph or report of such data. Each data value stored or collected by storage 102 becomes a data point.

As a further feature of system 100, data storage 102 could be directed by backend server 106 to store or persist different types of measured data values at different rates or time intervals. For example, in addition to the input data from a particular geographically defined area as described in the above example, data storage 102 could also receive similar measured values of power usage from a neighboring area, also at one minute intervals. However, backend server 106 could respond to a user instruction to have data storage 102 persist the latter data values only at thirty minute intervals, rather than at five minute intervals as was done for the input values of the particular area. This capability can be provided without affecting the real-time operation of system 100, in generating a graph 116.

When a set of data points previously stored in data storage 102 are requested for use to construct a graph 116, some amount of interaction must occur, in transferring the data set from storage 102 to the server 106. Also, further interaction occurs in presenting the data set for display by display device 108, or other client component. Clearly, some mechanism, comprising respective network and display elements, must be provided to carry out all of these efforts. Accordingly, system 100 of FIG. 1 is provided with a data transfer and display performance mechanism 104, which collectively represents and comprises all the necessary network and display elements.

It is to be appreciated that operation of mechanism 104 can be significantly affected by the amount of requested data points that it must handle. For example, if mechanism 104 must transfer 10,000 data points from storage 102 to a client associated with display 108, in order to load a particular graph 116, the performance of mechanism 104 may be much slower than if only 100 data points are required. A request for the 10,000 data points could even cause the client to hang indefinitely.

To avoid or minimize an issue of the above type, embodiments of the invention provide a user with the capability to adjust or control mechanism 104 over a wide range, in order to transfer and display only the level or amount of data which is actually needed for a particular graph 116. Thus, if the data level of detail is such that only 100 data points are needed for a graph, by way of example, the user can have mechanism 104 adjusted to prevent transfer of any higher amount of data. On the other hand, if 10,000 data points are required, the user can adjust mechanism 104 to transfer this amount of data, and accept a possible reduction in system performance.

To implement the above adjustment capability, GUI 110 is operable by a user to send a data transfer/display instruction to backend server 106. This instruction specifies a maximum amount of data points that need to be transferred from data storage 102, in order to construct a particular graph 116. In response to this instruction, server 106 adjusts mechanism 104 to limit data transfer to the maximum amount which corresponds to transfer of successive data points at specified intervals. Usefully, GUI 110 is provided with first slider bar 118, which could be operated by a user to readily select the maximum amount of data points to be transferred, from a particular data point range.

In order to construct a graph 116, it is necessary for a user to specify a time for the graph. This time could be an hour, a 24 hour day, or a specified number of days, by way of example and not limitation. After a graph time has been selected, the user operates GUI 110 to send the time to backend server 106, for use in constructing graph 116.

Each data point requested will increase the graph visual complexity. Thus, each data point used in a line graph will add detail to the shape of the line graph. Similarly, each data point used in a bar graph will add another bar. At some data level of detail, depending on the volatility of the data, the graphs will become unreadable. Some types of data, such as total water overflow during a time period of a week, can be non-volatile and will appear to be smooth at both low and high data levels of detail. On the other hand data such as instantaneous electric power use can be quite volatile, and be very difficult to read at high data levels of detail.

In view of this situation, embodiments of the invention such as system 100 enable a user of GUI 110 to adjust data level of detail by selecting a data level of detail value, and routing that value to backend server 106. As used herein, the term "data level of detail" means a parameter having a specified numerical value that is used to divide the graph time into a number of time intervals equal to the specified numerical value, such as multiple equal intervals. Each interval is then provided with a representative data value, or most representative value, as described hereinafter in further detail. FIG. 1 shows GUI 110 having second slider bar 120, which may be operated by a user to readily select a data level of detail value from a range of such values.

Figure 2:
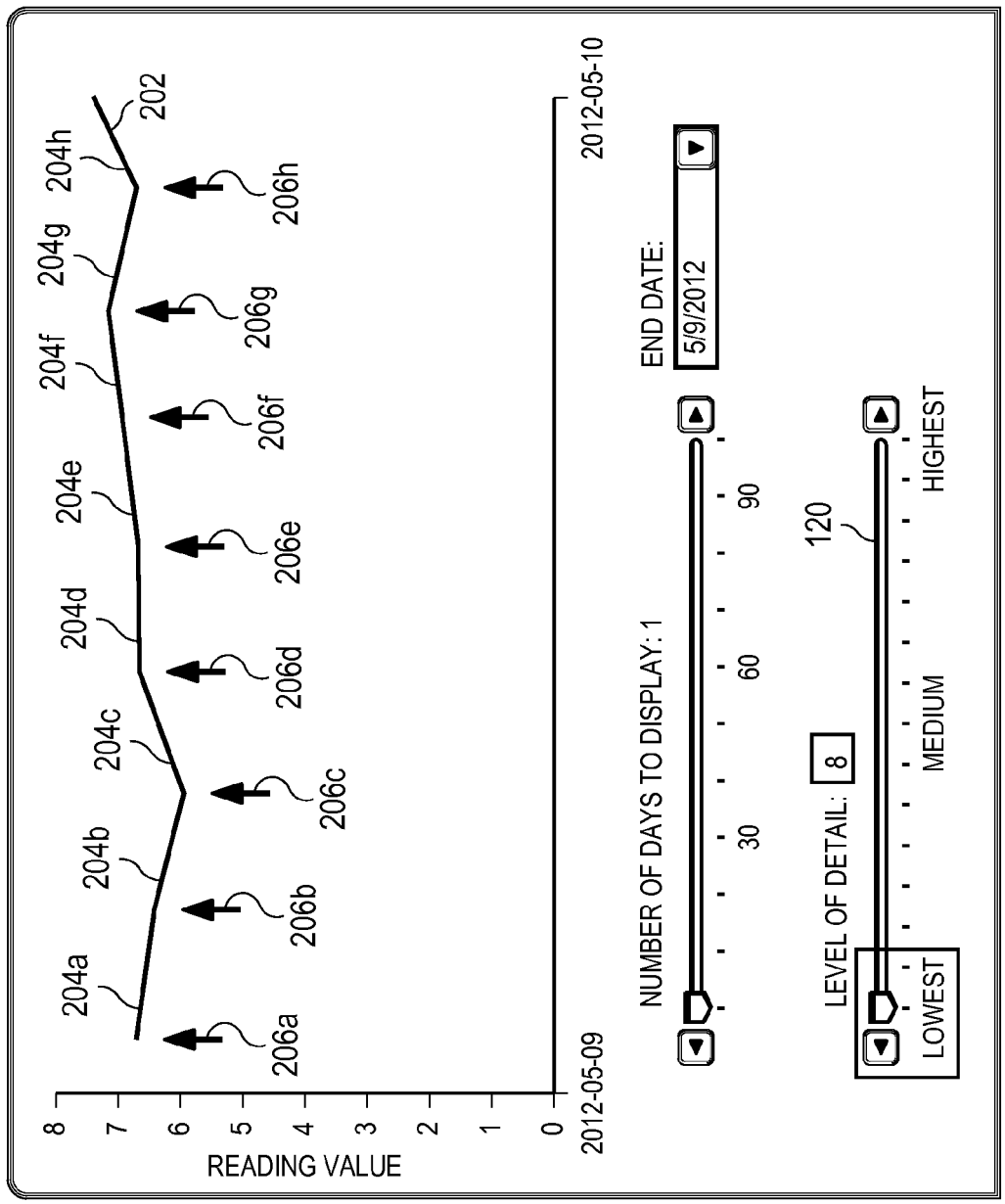
FIGS. 2-4 respectively depict data graphs generated in accordance with an embodiment of the invention, wherein respective graphs provide different data levels of detail.
Figure 3:
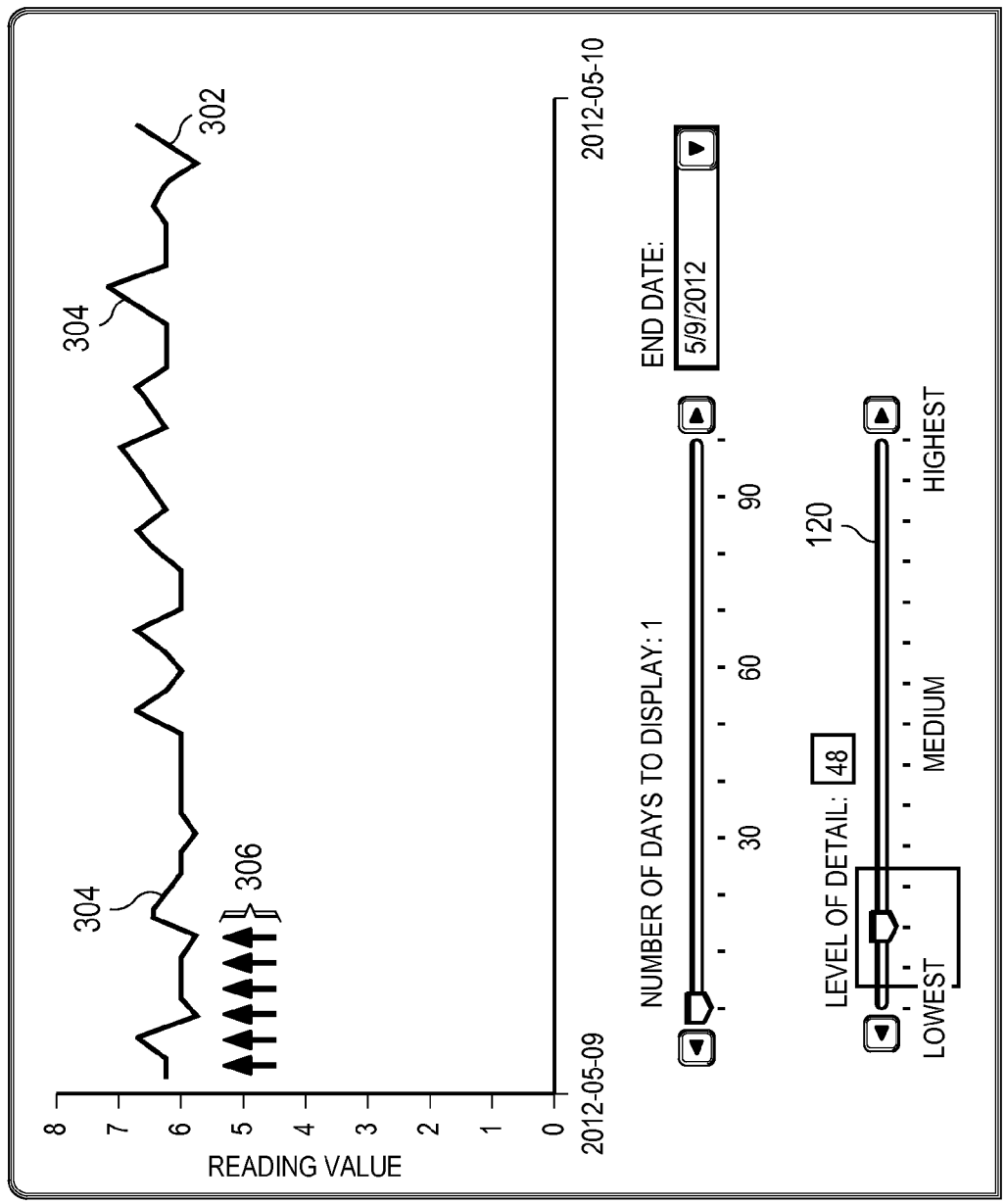
Figure 4:
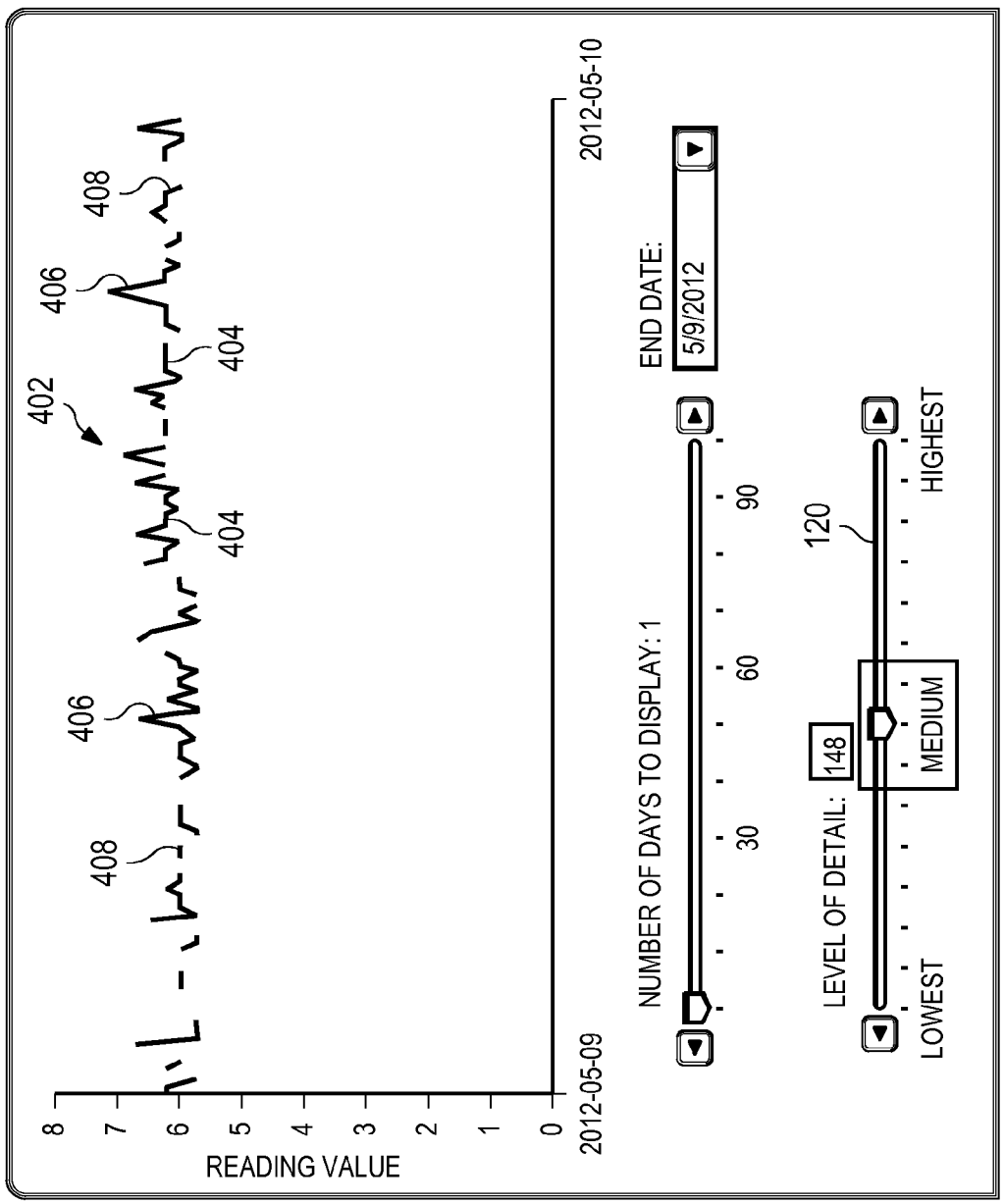

FIGS. 2-4 each shows a graph of data points over an exemplary one day time period, and more particularly during May 9, 2012, in order to further illustrate data levels of detail as described above. Each figure also depicts slider bar 120 set to a value which corresponds to its respective graph.

Referring to FIG. 2, there is shown data graph 202. Slider bar 120 is set to provide its lowest data level of detail for this illustration, that is, a data level of detail of 8. Accordingly, the one day time period of FIG. 2 is divided into eight time intervals 204a-h. Data points included in a time interval are then selectively processed, as described hereinafter in further detail, to compute or determine a most representative value for that interval. FIG. 2 shows respective most representative values 206a-h for graph 202.

Referring to FIG. 3, there is shown a data graph 302, wherein the slider bar 120 is set to a data level of detail of 48. Thus, the one day time period is divided into 48 intervals 304, only some of which are shown in FIG. 3. One or more data points included in each time interval 304 are then processed to compute or determine a most representative value 306 for that interval, only some of which are shown in FIG. 3.

Referring to FIG. 4, there is shown a data graph 402, wherein the slider bar 120 is set to a data level of detail of 148. FIG. 4 thus divides the time period into 148 intervals such as intervals 404. FIG. 4 also shows data points 406. If a time period is too small for a data level of detail, there could be empty spaces in the graph. For example, if the time period is 24 hours and data points are provided for a graph only at thirty minute intervals, empty spaces 408 would occur, as shown by FIG. 4.

To further illustrate an embodiment of the invention, it is considered that the time period of a graph to be constructed has an exemplary value of 24 hours. Moreover, data storage 102 and transfer mechanism 104 have respectively been adjusted to furnish successive data points for the graph at exemplary five-minute intervals. Thus, for this example, 12 data points are provided each hour. If the data level of detail is selected to be 48 by way of example, the 24 hour time period would be divided into 48 half-hour intervals, wherein each interval includes or contains six data points.

For the embodiment of the invention, it is necessary to compute or otherwise determine a most representative data value for each interval. This is done for an interval by selectively processing each of the data points of that interval, wherein a number of options are available to carry out this task.

In accordance with one option, a most representative value (MRV) criterion is sent from GUI 110 to backend server 106, wherein the criterion directs server 106 to select a particular algorithm from a set of MRV algorithms. Server 106 then implements the selected algorithm to compute most representative value for an interval, from the respective data point values of the interval. As one example, the algorithm could require choosing the maximum value of the data points of an interval to be the most representative value for the interval. More generally, the algorithm could be selected from the following set of instructions:

MAX—choose the maximum value from within this time interval
MIN—choose the minimum value from within this time interval
AVG—choose the average value from within this time interval
MEAN—choose the mean value from within this time interval
MEAN-n—choose the mean value from within this time interval removing n outliers from the calculation
RANDOM—choose a random value from within this time interval
CUSTOM—custom method of choosing a value from within this time interval As another option, shown by an entry of the above set, a user can provide a customized procedure for choosing the most representative value of an interval. GUI 110 is provided with a button 122 that a user can operate for this purpose. As an example of a customized procedure, all data point values of an interval that exceeded a specified maximum value would be averaged to determine the most representative value for the interval. As further examples, a customized algorithm could be provided that selected the earliest data point value of an interval, the latest data point value thereof, or the value of the data point received at the middle of the interval, or midinterval, to be the most representative value for that interval.

In a further approach to determining the most representative value for respective intervals, backend server 106 is configured to decide itself what algorithm to use in determining most representative value. To implement this approach, server 106 is provided with a number of algorithms, and also with a rule or criteria for each algorithm. A button 124 of GUI 110 can be operated by a user for this purpose. Each rule or criteria specifies the conditions for selecting the corresponding algorithm. Thus, when backend server 106 recognizes that the conditions for a given algorithm have occurred, the server will select that algorithm to compute the most representative value. Such conditions could include alerts, thresholds or other properties that have been furnished to server 106 by the user.

As an example of the above conditions, input measurement data to be used for constructing a graph has an upper threshold which is defined as an alert trigger. This condition directs server 106 to select the maximum data point value to be the most representative value. In a further example, the measured data could have both upper threshold and lower threshold triggers that were to be monitored. For this case, backend server 106 could be configured to select both the maximum and minimum data point values of respective intervals, and display both minimum and maximum values on a single overlaid graph. Moreover, in some embodiments of the invention, multiple algorithms may be selected to produce multiple overlaid graphs.

Figure 5:
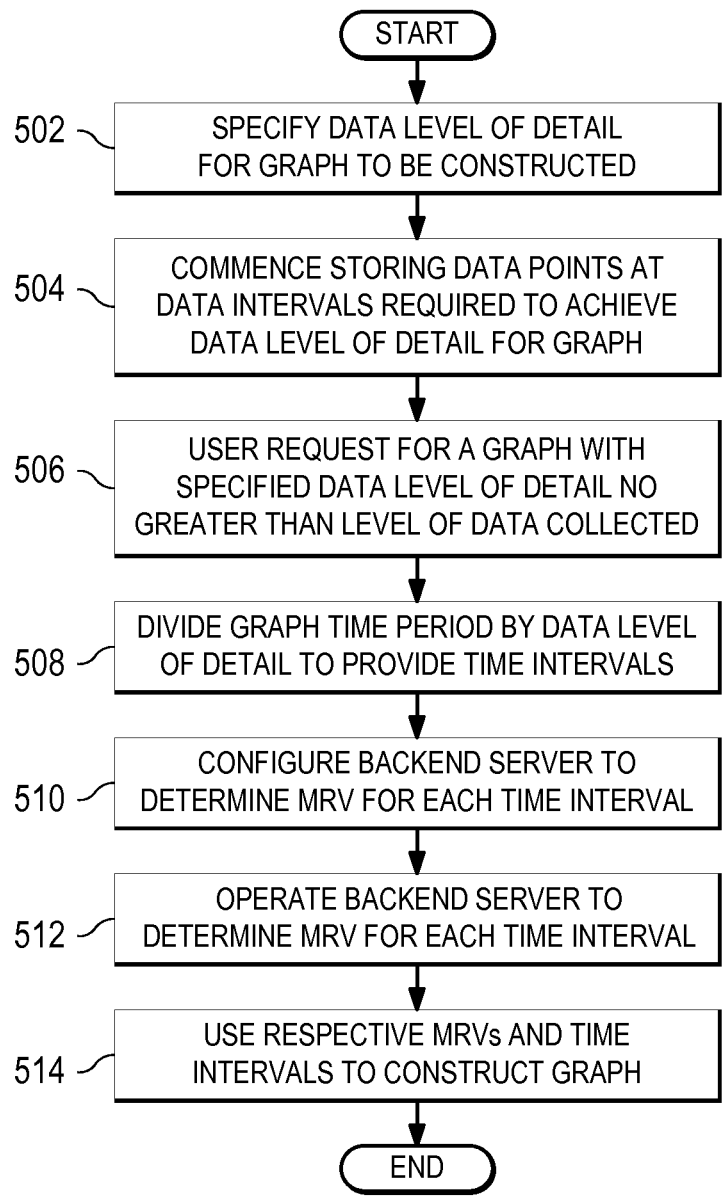
FIG. 5 is a flowchart showing steps of a method comprising an embodiment of the invention.

Referring to FIG. 5, there are shown steps 502-516 for a method comprising an embodiment of the invention. It is to be emphasized that steps 502 and 504 take place at data collection time, whereas steps 506-514 take place at the time construction of a particular graph is requested. Data collection must take place before a graph is requested. If the graph is requested to be over a particular time period, data for that requested time period must have already been collected. Moreover, at data collection time, the scale at which data is collected, or the sampling rate, determines the highest possible level that data can be retrieved at later, and cannot be changed later. An embodiment of the invention can aggregate data points, but cannot insert new data points into previously collected data. Accordingly, the configuration of the data collector determines the highest level of detail that can be shown later in a constructed graph.

In view of the above, at step 502 a data level of detail is specified, which is the highest required data level of detail for any graph which is to be generated or constructed, such as a graph 116 as described above.

Step 504 commences storing data points, by means of data storage 102 or the like. The storage rate, or intervals at which data points are stored, is selected in relation to the specified highest required data level of detail, in order to ensure that sufficient data points will be stored to meet or achieve the specified highest required data level of detail, for any graph that may be constructed.

At step 506, a user requests construction of a graph, and further specifies a data level of detail for the graph that will not exceed limits imposed by the prior collection of data, in accordance with steps 502 and 504.

At step 508, a data transfer and display mechanism, such as mechanism 104 described above, is adjusted in relation to the specified data level of detail of the requested graph, to ensure that sufficient data points will flow through the mechanism to meet or achieve the specified data level of detail.

At step 510 the graph time period is divided by the data level of detail of the requested graph, to provide respective time intervals.

At step 512, a backend server such as server 106 is configured for use in determining a most representative value for each time interval. Step 512 could include providing the server algorithms and corresponding criteria or rules, as described above.

At step 514 the backend server is operated to determine a most representative value for each time interval. At step 516 respective most representative values and time intervals are used to construct a graph, and the method of FIG. 5 ends.

Figure 6:
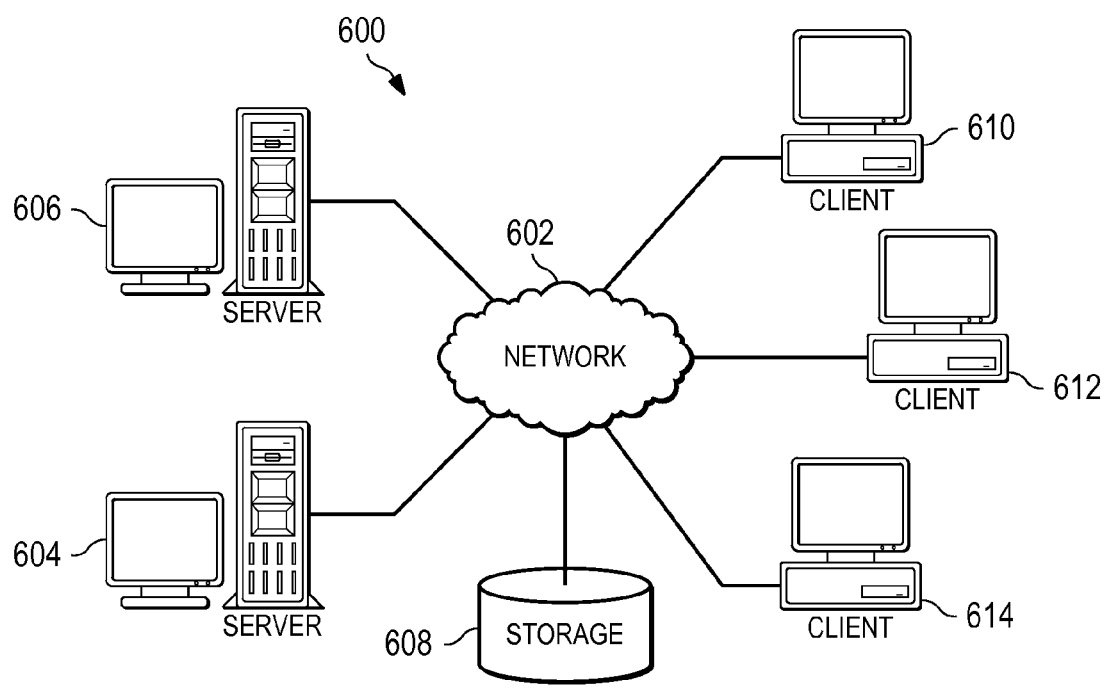
FIG. 6 is a block diagram showing a network of data processing systems in which an embodiment of the invention may be implemented.

FIG. 6 is a pictorial representation of a network of data processing systems in which illustrative embodiments of the invention may be implemented. Network data processing system 600 is a network of computers in which the illustrative embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server computer 604 and server computer 606 connect to network 602 along with storage unit 608. In addition, client computers 610, 612, and 614 connect to network 602. Client computers 610, 612, and 614 may be, for example, personal computers or network computers. In the depicted example, server computer 604 provides information, such as boot files, operating system images, and applications to client computers 610, 612, and 614. Client computers 610, 612, and 614 are clients to server computer 604 in this example. Network data processing system 600 may include additional server computers, client computers, and other devices not shown.

Program code located in network data processing system 600 may be stored on a computer-recordable storage medium and downloaded to a data processing system or other device for use. For example, program code may be stored on a computer-recordable storage medium on server computer 604 and downloaded to client computer 610 over network 602 for use on client computer 610.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 600 also may be implemented as a number of different types of networks, such as, for example, an intranet, a local area network (LAN), or a wide area network (WAN). FIG. 6 is intended as an example, and not as an architectural limitation for the different illustrative embodiments.

Figure 7:
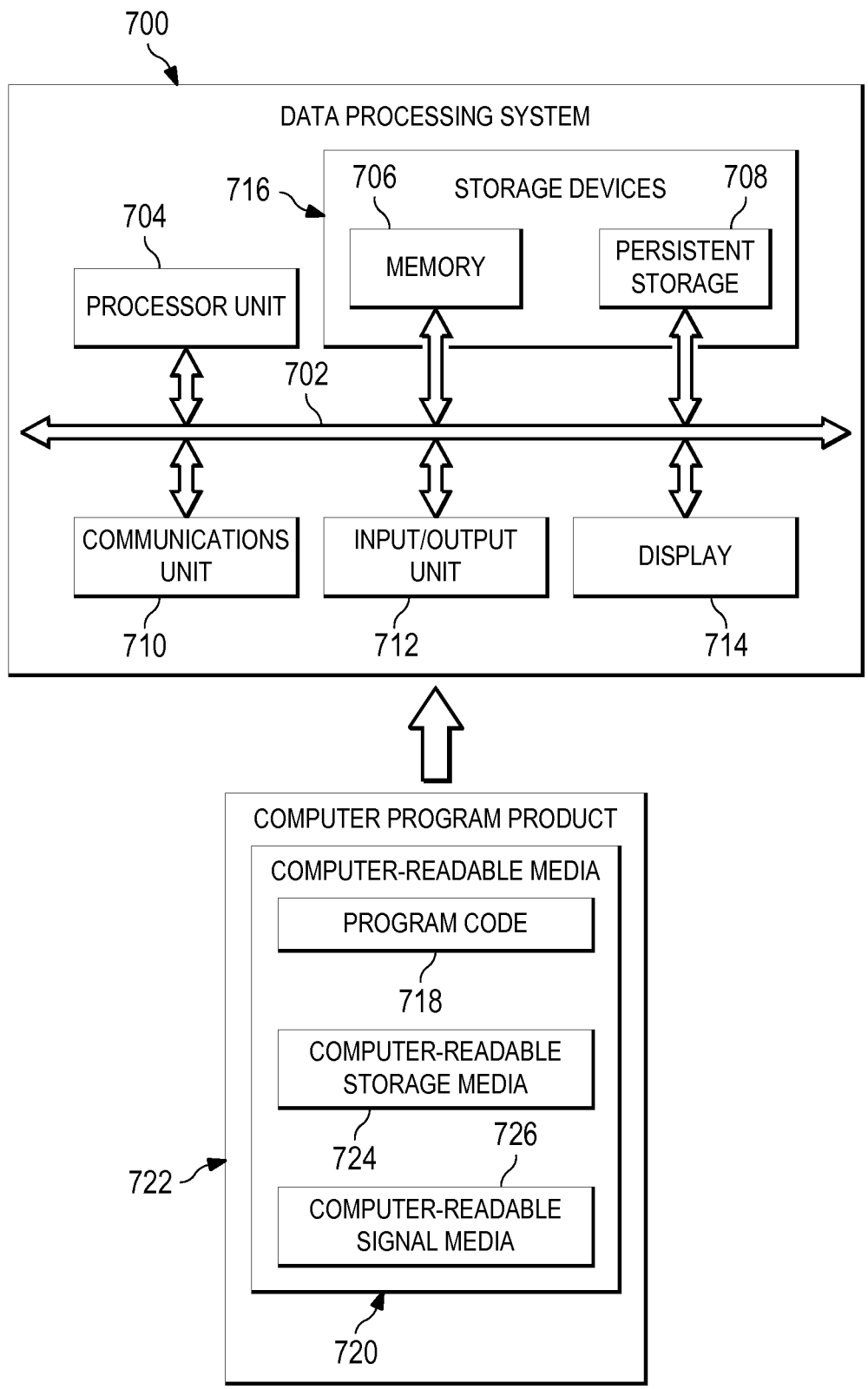
FIG. 7 is a block diagram showing a computer or data processing system that may be used in implementing embodiments of the invention.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for constructing a graph which pertains to measured values of a specified metric, the method comprising:

selectively storing successive measured values of the specified metric received as input sensor measurement data in a storage device by a processor unit of a data processing system, wherein each stored value comprises a data point;

routing successive data points from the storage device by the processor unit using network and display elements, comprising a data transfer and display performance mechanism of the data processing system to a location associated with the graph, wherein a first number of data points are included in a specified graph time period;

computing multiple time intervals, by the processor unit, using a value that represents a particular data level of detail specified by a user to divide the specified graph time period into the multiple time intervals equal to the value specified, wherein each time interval includes a second number of data points, and wherein the second number of data points is less than the first number of data points;

selecting an algorithm from a set of algorithms, by the processor unit, to use in computing a most representative value responsive to receiving a rule or criteria associated with a particular algorithm from the user, and wherein each rule or criteria specifies conditions for selecting a corresponding algorithm, and wherein the conditions include information comprising alerts, thresholds or predetermined properties provided by the user, and wherein input measurement data, used for constructing the graph, having an upper threshold that defines an instance of an alert trigger, wherein a server is provided with the set of algorithms, and selects one of the algorithms for use in determining the most representative value for a time interval, wherein the set of algorithms is a group of algorithms comprising a MAX—choose a maximum value from within this time interval, a MIN—choose a minimum value from within this time interval, an AVG—choose an average value from within this time interval, a MEAN—choose a mean value from within this time interval, a MEAN-n—choose the mean value from within this time interval removing n outliers from a calculation, a RANDOM—choose a random value from within this time interval, and a CUSTOM—choose a value from within this time interval to be the most representative value for that interval, by selecting one of:

an average of all data point values of the time interval that exceed a specified maximum value;

an earliest data point value of the time interval;

a latest data point value of the time interval; and
a value of the data point received at a middle of the time interval;
selectively processing the second number of data points of a respective time interval, in accordance with prespecified criteria received from the user, and at least one selected algorithm, by the processor unit to compute the most representative value for that time interval; and
constructing one or more of the graph by the processor unit using: the most representative value of each respective time interval.

2. The method of claim 1, wherein:
the measured values of the specified metric are stored at a specified data storage rate, comprising storing the measured values at successive specified intervals, and wherein the specified data storage rate is determined in relation to the particular data level of detail.

3. The method of claim 2, wherein:
the specified data storage rate is determined by the user of the data processing system which is operable to construct the graph.

4. The method of claim 2, wherein:
the measured values of the specified metric are stored in a given data storage device at the specified data storage rate, and successive measured values of a different metric are stored in the given data storage device at a data storage rate that is different from the specified data storage rate.

5. The method of claim 1, wherein:
the data processing system which is operable to construct the graph is provided with a slider bar that is operable by the user to select the particular data level of detail, and wherein when a time period is less than a predetermined threshold for a data level of detail specified, a void is represented in the graph.

6. The method of claim 1, wherein:
the data transfer and display performance mechanism associated with construction of the graph is adjusted in relation to the particular data level of detail, to provide respective data points at intervals selected to enable the graph to be constructed with the particular data level of detail.

7. The method of claim 6, wherein:
the data transfer and display performance mechanism has a set of interactions that comprises, collectively, all the interactions of a data transfer component and a display component of the data processing system which is operable to construct the graph.

8. The method of claim 1, wherein:
a specified server of the data processing system is selectively configured to process the second number of data points of each time interval to determine the most representative value for each time interval.

9. The method of claim 8, wherein:
the specified server is configured by providing the specified server with a set of algorithms and the prespecified criteria, wherein a portion of the prespecified criteria corresponds to a given algorithm, and responsive to determining that criteria corresponding to the given algorithm has been met by data points of a given time interval, the specified server selects the given algorithm for use in determining the most representative value for the given time interval.

10. The method of claim 8, wherein:
the specified server is responsive to a condition associated with a maximum value threshold and a minimum threshold, selectively, when detecting values of respective data points of a given time interval.

11. The method of claim 8, wherein:
the user provides the specified server with a customized algorithm for use in computing the most representative value for a time interval.

12. The method of claim 1, wherein:
the graph constructed is presented for display, and the graph constructed is displayed and is overlaid by at least one other graph constructed, and wherein when a maximum and minimum data point values of respective intervals are selected both minimum and maximum values are displayed on a single overlaid graph, and wherein when multiple algorithms are selected multiple overlaid graphs are constructed.

13. A computer program product comprising a non-transitory recordable storage medium having instructions for execution by a processor unit of a data processing system stored thereon for constructing a graph which pertains to measured values of a specified metric, instructions further comprising:
instructions for selectively storing successive measured values of the specified metric received as input sensor measurement data in a storage device of the data processing system, wherein each stored value comprises a data point;
instructions for using network and display elements, comprising a data transfer and display performance mechanism for routing successive data points from the storage device to a location associated with the graph, wherein a first number of data points are included in a specified graph time period;
instructions for computing multiple time intervals, using a value that represents a particular data level of detail specified by a user to divide the specified graph time period into the multiple time intervals equal to the value specified, wherein each time interval includes a second number of data points, and wherein the second number of data points is less than the first number of data points;
instructions for selecting an algorithm from a set of algorithms, by the processor unit, to use in computing a most representative value responsive to receiving a rule or criteria associated with a particular algorithm from the user, and wherein each rule or criteria specifies conditions for selecting a corresponding algorithm, and wherein the conditions include information comprising alerts, thresholds or predetermined properties provided by the user, and wherein an input measurement data, used for constructing the graph, having an upper threshold that defines an instance of an alert trigger, wherein the processor unit of a server is provided with the set of algorithms, and selects one of the algorithms for use in determining the most representative value for a time interval, wherein the set of algorithms is a group of algorithms comprising a MAX—choose a maximum value from within this time interval, a MIN—choose a minimum value from within this time interval, an AVG—choose an average value from within this time interval, a MEAN—choose a mean value from within this time interval, a MEAN-n—choose the mean value from within this time interval removing n outliers from a calculation, a RANDOM—choose a random value from within this time interval, and a CUSTOM—choose a value from within this time interval to be the most representative value for that interval, by selecting one of:
an average of all data point values of the time interval that exceed a specified maximum value;

an earliest data point value of the time interval;
a latest data point value of the time interval; and
a value of the data point received at a middle of the time interval;
instructions for selectively processing the second number of data points of a respective time interval, in accordance with prespecified criteria received from the user, and at least one selected algorithm, to compute the most representative value for that time interval; and
instructions for constructing one or more of the graph using the most representative value of each respective time interval.

14. The computer program product of claim 13, wherein:
the measured values of the specified metric are stored at a specified data storage rate, comprising storing the measured values at successive specified intervals, wherein the specified data storage rate is determined in relation to the particular data level of detail.

15. The computer program product of claim 14, wherein:
the specified data storage rate is determined by the user of the data processing system which is operable to construct the graph.

16. The computer program product of claim 13, wherein:
a specified server of the data processing system is selectively configured to process the second number of data points of each time interval to determine the most representative value for respective time intervals.

17. The computer program product of claim 16, wherein:
the specified server is provided with the set of algorithms, and selects one of the algorithms for use in determining the most representative value for a time interval.

18. The computer program product of claim 16, wherein:
the specified server is configured by providing the specified server with the set of algorithms and the prespecified criteria, wherein a portion of the prespecified criteria corresponds to a given algorithm, and responsive to determining that criteria corresponding to the given algorithm has been met by data points of a given time interval, the specified server selects the given algorithm for use in determining the most representative value for the given time interval.

19. A computer system for constructing a graph which pertains to measured values of a specified metric, comprising:
a bus;
a memory connected to the bus, wherein program code is stored on the memory; and
a processor unit connected to the bus, wherein the processor unit executes the program code:
to selectively store successive measured values of the specified metric received as input sensor measurement data in a storage device by the processor unit, wherein each stored value comprises a data point;
to route successive data points from the storage device by the processor unit using network and display elements, comprising a data transfer and display performance mechanism of the computer system to a location associated with the graph, wherein a first number of data points are included in a specified graph time period;
to compute multiple time intervals, by the processor unit, using a value that represents a particular data level of detail specified by a user to divide the specified graph time period into the multiple time intervals, wherein each time interval includes a second number of data points, and wherein the second number of data points is less than the first number of data points;
to select an algorithm from a set of algorithms, by the processor unit, to use in computing a most representative value responsive to receiving a rule or criteria associated with a particular algorithm from the user, and wherein each rule or criteria specifies conditions for selecting a corresponding algorithm, and wherein the conditions include information comprising alerts, thresholds or predetermined properties provided by the user, and wherein input measurement data, used for constructing the graph, having an upper threshold that defines an instance of an alert trigger, wherein the processor unit of a server is provided with the set of algorithms, and selects one of the algorithms for use in determining the most representative value for a time interval, wherein the set of algorithms is a group of algorithms comprising a MAX—choose a maximum value from within this time interval, a MIN—choose a minimum value from within this time interval, an AVG—choose an average value from within this time interval, a MEAN—choose a mean value from within this time interval, a MEAN-n—choose the mean value from within this time interval removing n outliers from a calculation, a RANDOM—choose a random value from within this time interval, and a CUSTOM—choose a value from within this time interval to be the most representative value for that interval, by selecting one of:
an average of all data point values of the time interval that exceed a specified maximum value;
an earliest data point value of the time interval;
a latest data point value of the time interval; and
a value of the data point received at a middle of the time interval;
to selectively process the second number of data points of a respective time interval, in accordance with prespecified criteria, received from the user and at least one selected algorithm, by the processor unit to compute the most representative value for that time interval; and
to construct one or more of the graph by the processor unit using the most representative value of each respective time interval.

* * * * *